(12) United States Patent
Schoemann et al.

(10) Patent No.: US 7,143,498 B2
(45) Date of Patent: Dec. 5, 2006

(54) METHOD OF MANUFACTURING, 100% GRAINED WITH NON-SHUT-OFF CONDITION TWO SHOT INTERIOR COMPONENT

(75) Inventors: Michael P. Schoemann, Waterford, MI (US); John Youngs, Southgate, MI (US); Thomas W. Spanos, Chesterfield Township, MI (US); William J. Noble, Macomb, MI (US); David Turczynski, Highland, MI (US)

(73) Assignee: Lear Corporation, Southfield, MI (US)

( * ) Notice: Subject to any disclaimer, the term of this patent is extended or adjusted under 35 U.S.C. 154(b) by 114 days.

(21) Appl. No.: 10/785,904

(22) Filed: Feb. 24, 2004

(65) Prior Publication Data
US 2005/0183262 A1 Aug. 25, 2005

(51) Int. Cl.
*B21B 1/46* (2006.01)
*B28B 7/22* (2006.01)

(52) U.S. Cl. ............. 29/527.1; 29/527.3; 264/255

(58) Field of Classification Search ............ 29/527.1, 29/527.3, 530; 264/155, 328.7, 250, 241, 264/255; 425/130, 156
See application file for complete search history.

(56) References Cited

U.S. PATENT DOCUMENTS

| | | | |
|---|---|---|---|
| 444,711 A | 1/1891 | Reed | |
| 3,690,797 A * | 9/1972 | Garner | 425/146 |
| 3,809,519 A | 5/1974 | Garner | 425/245 |
| 4,165,959 A * | 8/1979 | Dechavanne | 425/130 |
| 4,460,534 A | 7/1984 | Boehm et al. | |
| 5,045,268 A | 9/1991 | Sorensen | 264/246 |
| 5,251,954 A | 10/1993 | Vande Kopple et al. | 296/192 |
| 5,609,890 A | 3/1997 | Boucherie | 425/120 |
| 5,750,162 A | 5/1998 | Schad et al. | 425/533 |
| 5,817,345 A | 10/1998 | Koch et al. | 425/130 |
| 5,830,404 A | 11/1998 | Schad et al. | 264/297.2 |
| 5,968,437 A * | 10/1999 | Harada | 264/266 |
| 6,402,504 B1 | 6/2002 | Hahn et al. | |
| 6,508,967 B1 | 1/2003 | Visconti et al. | |
| 6,872,345 B1 * | 3/2005 | Yustick | 264/255 |
| 2004/0017023 A1 | 1/2004 | Schoemann et al. | |

* cited by examiner

*Primary Examiner*—John C. Hong
(74) *Attorney, Agent, or Firm*—Bill Panagos

(57) ABSTRACT

The present invention relates to a two-shot, non-shut-off method of manufacturing a 100% grained trim component for a vehicle. The method includes actuating a tool insert between a mold cavity and a secondary void to form a molded trim component having a groove. A first shot of material is injected to form a first trim element having a grained class-A side. During the first shot, flash enters the secondary void to provide a non-shut-off condition. The tool insert is retracted to define a ditch in the first trim element. A second shot of material is injected to form a second trim element having a grained class-A side, during which time a portion of the second shot enters the ditch to provide a non-shut-off condition. The trim elements are then bonded where a portion the second trim element bonded to the first trim element within the groove.

12 Claims, 5 Drawing Sheets

METHOD OF MANUFACTURING, 100% GRAINED WITH NON-SHUT-OFF CONDITION TWO SHOT INTERIOR COMPONENT

FIELD OF THE INVENTION

This invention relates to a method of making interior trim components for a door in motor vehicles. More specifically, the present invention relates to a method of manufacturing a two shot interior trim component that is up to 100% grained with a non-shut-off condition for trim systems in a motor vehicle.

BACKGROUND OF THE INVENTION

Trim systems are well known in the prior art. Trim systems make the interior trim panel look more aesthetically pleasing to occupants in a motor vehicle. However, the method of manufacturing current interior trim panels can add significant cost to the consumer. Existing technology provides for interior trim systems that consist of more than one part. Each part has its' own surface texture and color to create a desired look. Existing technology has also attempted to create an interior trim panel that is only one piece, but often times there is a shut-off condition that results in a portion of the trim panel remaining without a grained texture. The shut-off condition may also result in significant wear issues and associated maintenance costs, or a significantly weakened joint area between the multi-shot components.

This invention solves the above-mentioned problems by creating a method of manufacturing interior trim panels that are up to 100% grained with a non-shut-off condition while maintaining superior multi-shot joint strength and still allowing the option of using two shots of material to create the desired look and feel with distinct grain, texture, and color.

SUMMARY OF THE INVENTION

The present invention relates to a two-shot, non-shut-off method of manufacturing a 100% grained trim component for the interior of a vehicle. One method of the present invention includes actuating a movable tool insert to define a first obstruction between a mold cavity and a secondary void therein. The mold cavity is adapted to receive a first and a second shot of material to form a molded trim component having a groove therein. This method further includes injecting the first shot of material into the mold cavity to form a first trim element having a grained class-A side. During injection of the first shot of material, the first obstruction is adapted to permit the flash to enter the secondary void, thereby providing a non-shut-off condition relative injecting the first shot of material. The movable tool insert is then retracted to define a ditch within the class-A side of the first trim element. The second shot of material is then injected into the secondary void. During injection of the second shot of material, the retracted movable tool insert is adapted to permit a portion of the second shot of material to enter the ditch to provide a non-shut-off condition relative to injecting the second shot of material. The second shot of material is adapted to form a second trim element having a grained class-A side. The second trim element is then bonded to the first trim element as they form within the mold cavity in a manner so as to permit at least a portion the second trim element to bond to the first trim element within the groove, thereby forming a molded trim component having up to a 100% grained class-A side.

In manufacturing this two shot interior component, the material for the first and second shot in low line vehicles comprises a plastic material such as polypropylene. In high-end vehicles, the first shot comprises a plastic material such as polypropylene and the second shot comprises a thermoplastic elastomer material. After the first shot of material is inserted, the tool insert retracts a distance between one and five millimeters.

This method will manufacture a first trim element with its own surface texture and color as well as a second trim element comprising its own surface texture and color.

The present invention further relates to another non-shut-off method of manufacturing a manufacturing a trim component for the interior of a vehicle. This method includes actuating a movable tool obstruction to define a ditch adjacent a mold cavity. The mold cavity adapted to form a molded trim component having a groove therein. The method further includes injecting a first shot of material into the mold cavity so as to substantially stop at the actuated movable tool obstruction. The first shot of material is adapted to form a first trim element having a grained class-A side while the actuated movable tool obstruction is adapted to permit the flash to enter the ditch to provide a non-shut-off condition relative to injecting the first shot of material. This method further includes injecting the second shot of material into the secondary void to form a second trim element having a grained class-A side. The retracted movable tool obstruction is adapted to permit the flash to enter the ditch to provide a non-shut-off condition relative to injecting the second shot of material. Additionally, the movable tool obstruction is retracted during the step of injecting the second shot of material to define a secondary void within the mold cavity and to operatively position the ditch therebetween. The second trim element is then bonded to the first trim element as they form within the mold cavity, in a manner such that at least a portion the second trim element is bonded to the first trim element within the groove to form a molded trim component having up to a 100% grained class-A side.

The present invention further includes yet another non-shut-off method manufacturing a trim component for the interior of a vehicle. This method of the present invention includes actuating a movable tool obstruction within a mold cavity adapted to form a molded trim component having a groove therein. The actuated movable tool obstruction adapted to partition the mold cavity from a secondary void therein substantially at the groove. This method further includes injecting a first shot of material into the mold cavity so as to substantially stop at the actuated movable tool obstruction. The first shot of material is adapted to form a first trim element having a grained class-A side. A second shot of material is then injected into the secondary void to form a second trim element having a grained class-A side. The retracted movable tool obstruction is adapted to permit a portion of the second shot of material to operatively engage the class-B side of the first trim element as it forms to provide a non-shut-off condition relative to injecting the second shot of material. This method further includes retracting the movable tool obstruction during the step of injecting the second shot of material to define a secondary void within the mold cavity. Then the second trim element is bonded to the first trim element as they form within the mold cavity, wherein at least a portion the second trim element is bonded to the class-B side of the first trim element, so as to abut a portion of the class-A side of the second trim element to a portion of the class-A side of the first trim element within the groove, thereby forming a molded trim component having up to a 100% grained class-A side.

This invention will manufacture interior trim components in a 100% grained manner with a non-shut-off condition that has long been desired in the automotive industry. These methods eliminate problems that have long plagued the development of interior trim systems. Using these methods will eliminate the possibility of having a non-grained surface visible on the part. In addition, this invention utilizes methods in which the metal parts will not touch each other causing a shut-off and thereby creating a less than desired interior trim component. This invention ensures that each trim component will be up to 100% grained.

DETAILED DESCRIPTION OF THE DRAWINGS

DETAILED DESCRIPTION OF THE PREFERRED EMBODIMENT

Figure 1:
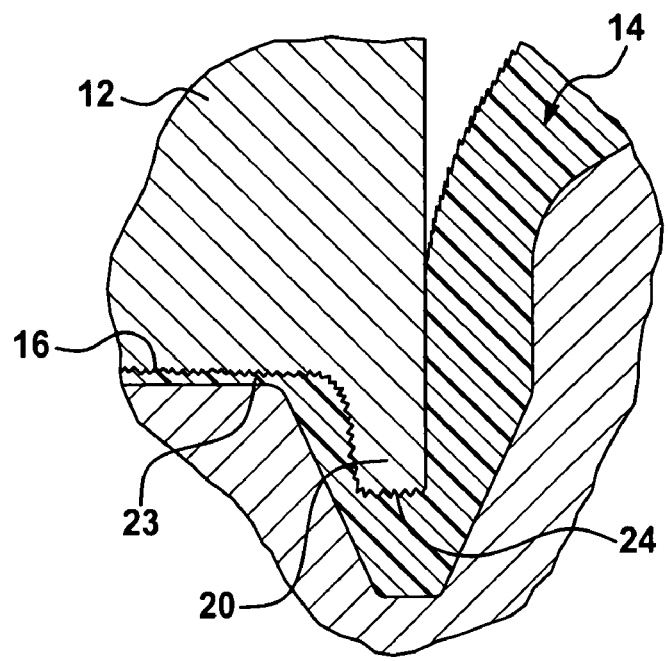
FIG. 1 is a fragmentary view of the mold and the first shot of material as it is injected into the mold cavity, according to one method of the present invention for low line vehicles.

This invention relates to a method of manufacturing interior trim components for trim systems in a motor vehicle. In one embodiment, seen in FIGS. 1–4, the method of manufacturing a two shot interior trim components for trim systems in motor vehicles that is up to 100% grained with a non-shut-off condition. The method includes producing a first trim element 8 and second trim element 10, bonded together within a mold cavity 12 having a tool insert 16 to form a molded trim component. The first trim element 8 is produced by inserting first shot of material 14 into the cavity 12 under a tool insert 16. The second trim element 8 is produced, once the tool insert 16 retracts, by injecting a second shot of material 18 to bond to the now newly formed first trim element 8. Specifically, the second shot of material 18 squeezes past the obstruction from the tool insert 16 and fills in the remaining portion of the cavity 12, thereby providing a molded trim component having up to a 100% grained class-A side.

In the embodiment illustrated in FIGS. 1–4, the insert 16 will create a groove 20 and further provides a dual parallel non-shut-off condition 22 as well as a flash off ditch 24. The groove 20 is to have a width between 0.1 and ten millimeters and a length between one and five millimeters. However, it is preferred that the width of the groove is only between one and two millimeters and a length between one and one-half and three millimeters. Those having ordinary skill in the art will appreciate that while the method of the present invention illustrated in FIGS. 1–4 is able to manufacture the desired trim components with a groove that has a larger width and length, demand in this industry requires that a smaller groove width and length is preferred.

Both the dual parallel non-shut-off condition 22 and the flash off ditch 24 serve to either slow or prevent movement of material. Specifically, by providing a reduced opening through which the material from the first shot 14 may flow from the mold cavity 12 to the secondary void, the dual parallel non-shut-off condition 22 is created. It is the reduced opening created by the tool insert that defines the first obstruction 23. In this manner, material from the first shot 14 is prevented from completely filling the secondary cavity. Generally, the opening in the first obstruction 23 is ranges between 0.0508 and 0.508 millimeters. Furthermore, the flash off ditch 24 prevents the material from the second shot 18 from moving any more than zero to five millimeters past that point. Specifically, the flash off ditch 24 prevents the material from the second shot 18 from overlapping the class-A side of the first trim element 8 in an undesirable manner. In a most preferred setting, the second shot material 18 will only move between two and three millimeters.

Figure 2:
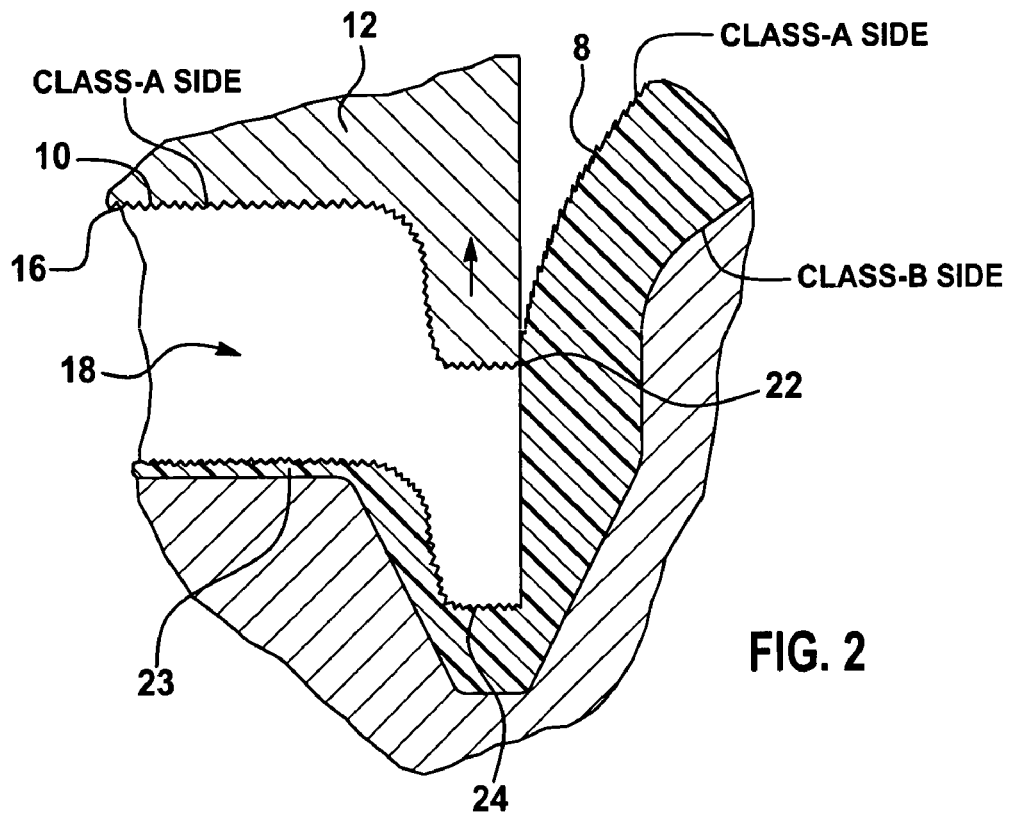
FIG. 2 is a fragmentary view of the retracted tool insert and injected second shot of material, according to the method of FIG. 1.

In low line vehicles, seen in FIGS. 1–2, the first shot of material 14 is pinched further to an opening between five and tenth thousandths of an inch. After the first shot of material 14 is pinched, the tool insert 16 is retracted. For low line vehicle settings, this tool insert 16 is retracted preferably four millimeters. The tool insert 16 needs to be fairly open because the second shot of material 18 needs to be able to flow. Once the second shot of material 18 is inserted, it fills the area between the tool insert 16 and over part of the first shot of material 14. Since it fills the upper part of flash off ditch 24, it creates a hook joint that is much stronger than a butt joint.

Figure 3:
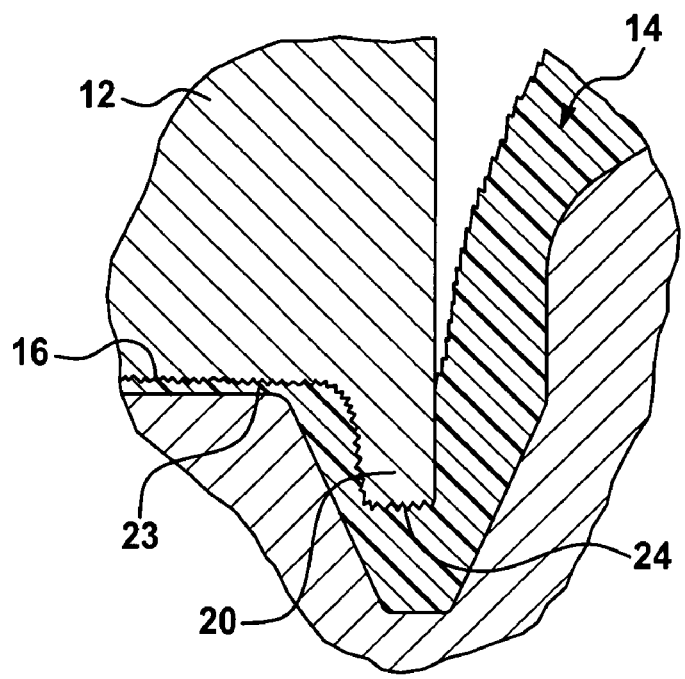
FIG. 3 is a fragmentary view of the mold and the first shot of material as it is injected into the mold cavity, according to the method of FIG. 1 for high line vehicles.
Figure 4:
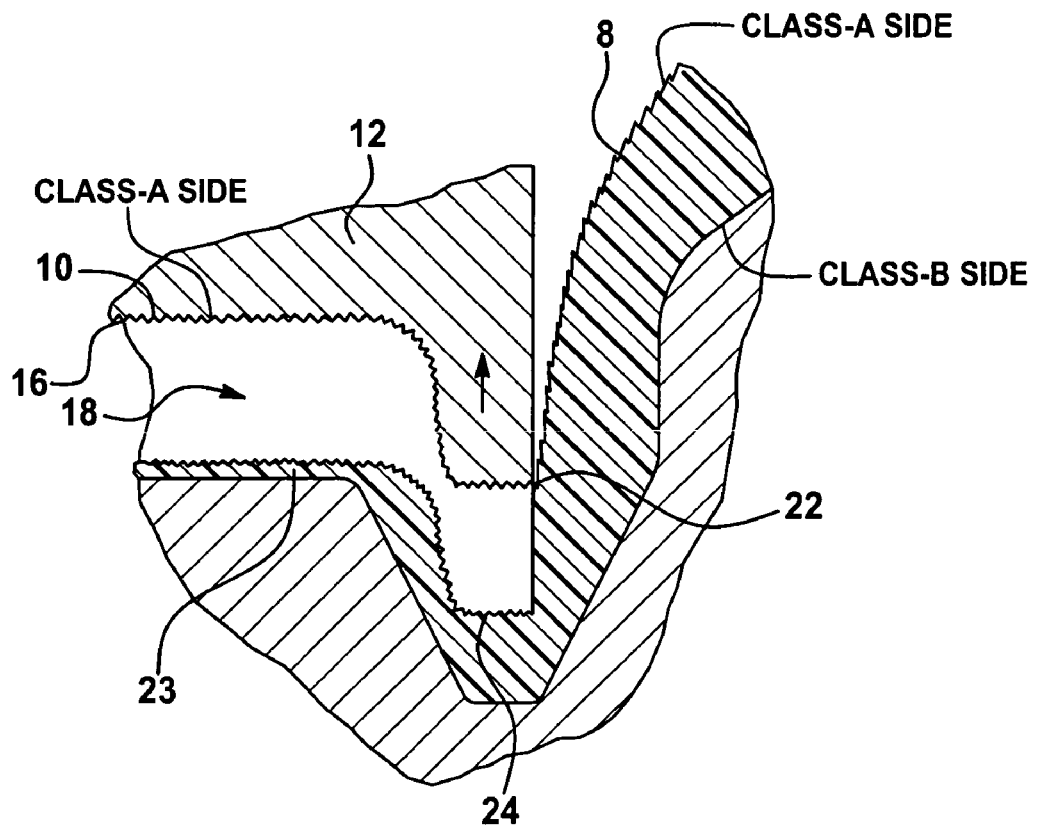
FIG. 4 is a fragmentary view of the retracted tool insert and injected second shot of material, according to the method of FIG. 3.

In high-end vehicles, seen in FIGS. 3–4, after the first shot of material 14 is also further pinched to an opening between five and fifteen thousandths of an inch. After the first shot of material is pinched, the tool insert 16 is retracted. However, the tool insert 16 only needs to be retracted about two millimeters. This is because the second shot of material 18 in high-end vehicles has an easier time flowing than the second shot of material 18 in low line vehicles due to the type of material used to create the desired look and texture.

Figure 5:
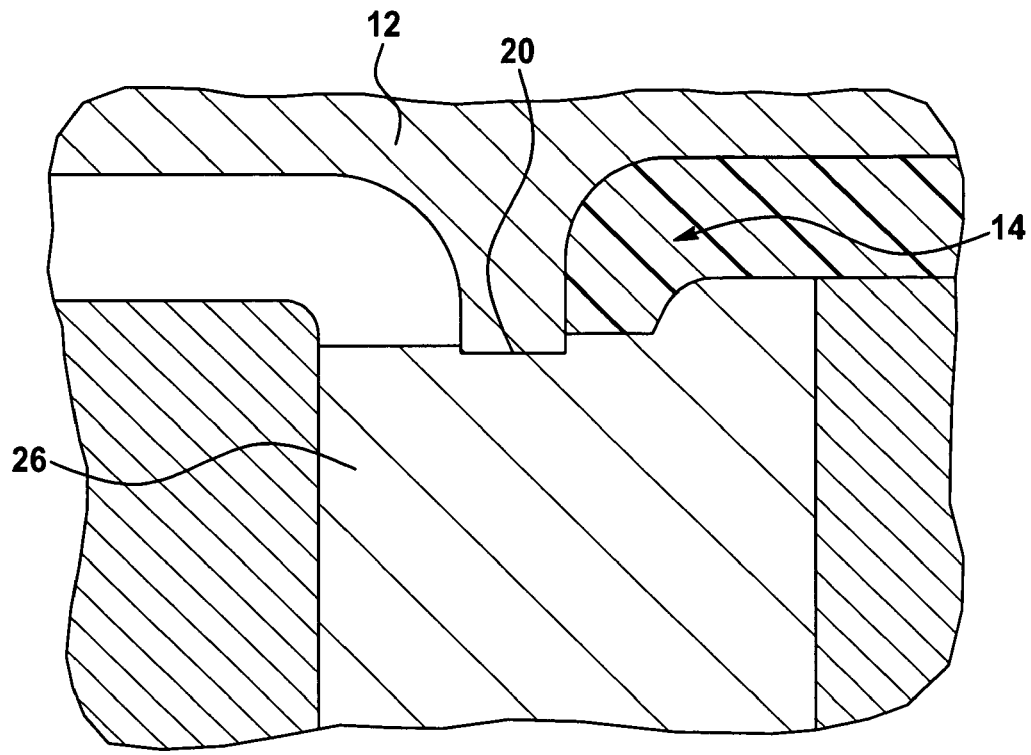
FIG. 5 is a fragmentary view of the mold and the first shot of material injected into the mold cavity, according to another method of the present invention.
Figure 6:
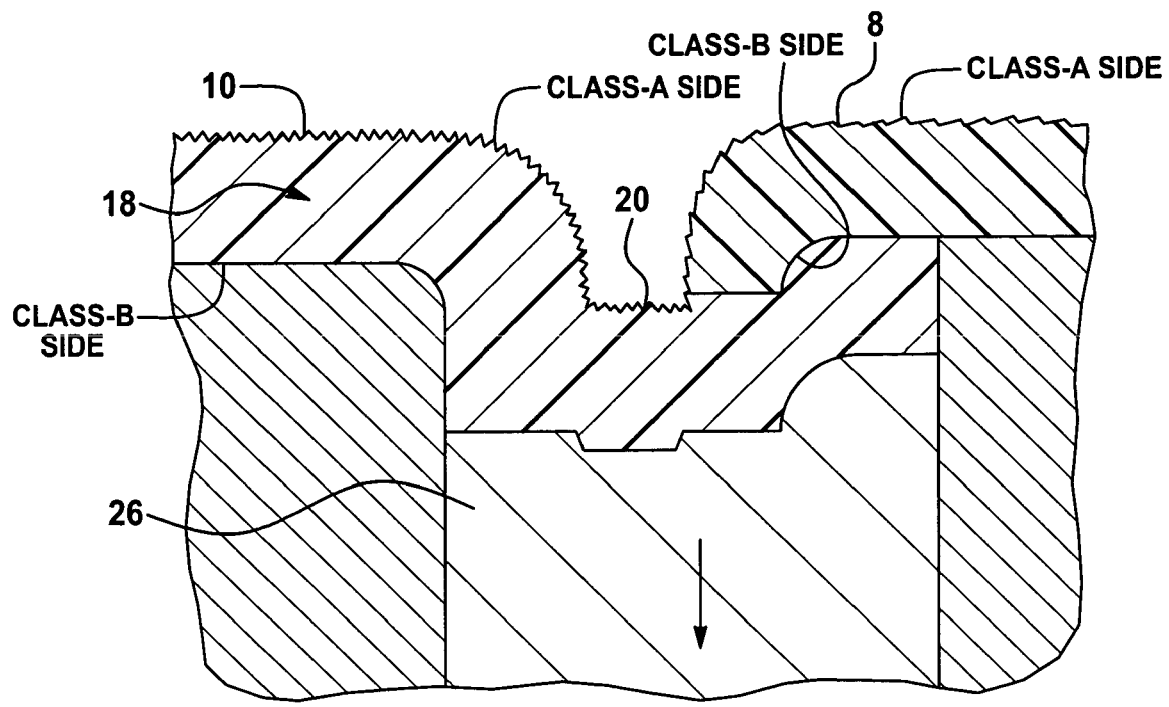
FIG. 6 is a fragmentary view of the retracted tool obstruction and injected second shot of material according to the method of FIG. 5.

Another embodiment of the method of the present invention is seen in FIGS. 5 and 6. This method includes producing a first trim element 8 and a second trim element 10. The first trim element 8 is produced by actuating the tool obstruction 26 and injecting the first shot of material 14 into the cavity 12 so that the material fills in and stops at the tool obstruction 26. The second trim element 10 is produced by retracting the tool obstruction 26 away from the cavity 12 and injecting the second shot of material 18 between the tool obstruction 26 and newly created first trim element 8.

Figure 7:
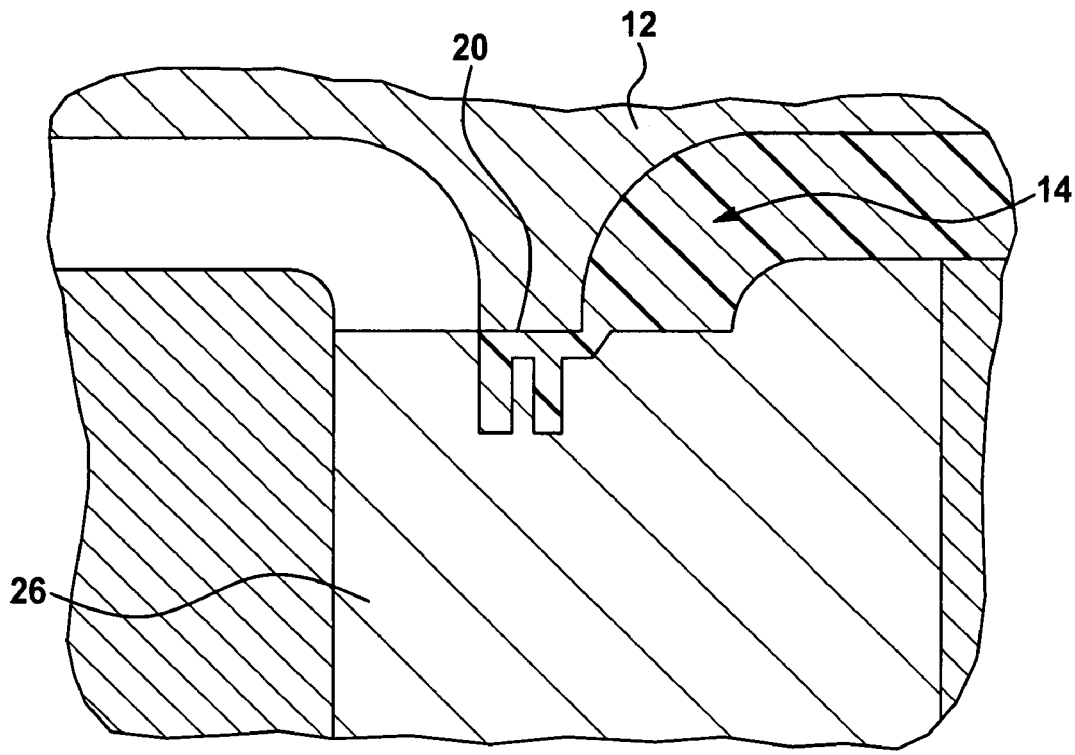
FIG. 7 is a fragmentary view of the mold and the first shot of material injected into the mold cavity according to yet another method of the present invention.
Figure 8:
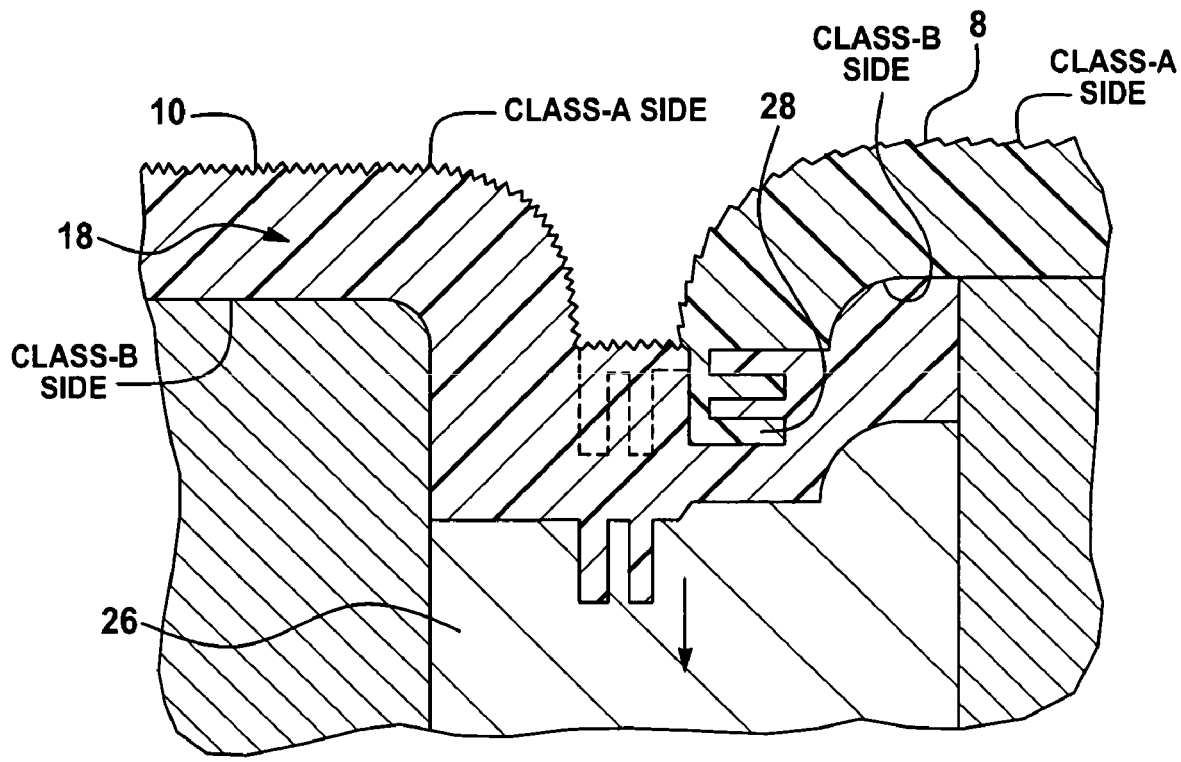
FIG. 8 is a fragmentary view of the retracted tool obstruction and injected second shot of material according to the method of FIG. 7.
Figure 9:
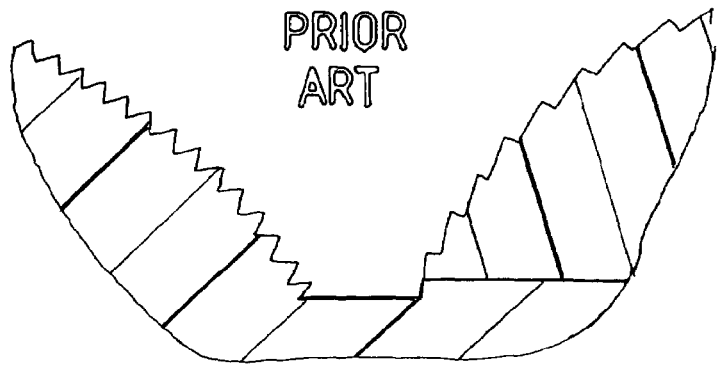
FIG. 9 is a fragmentary view of an interior trim component of the prior art that is not 100% grained.
Figure 10:
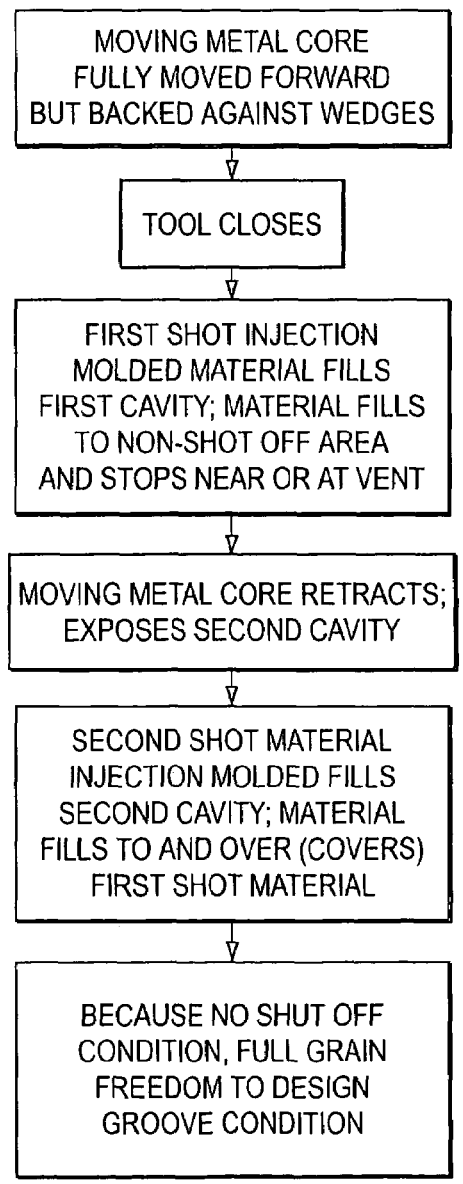
FIG. 10 is a flow chart generally outlining the steps of the methods of the present invention.

The tool obstruction 26 in this embodiment can be either smooth as seen in FIGS. 5–6 or jagged as seen in FIGS. 7–8.

This tool obstruction 26 starts at a distance of zero to ten thousandths of an inch away from the cavity 12 and moves away as material from the second shot 18 is inserted into the space between the tool obstruction 26 and the first trim element 8. In the most preferred settings, the tool obstruction 26 should start at a distance of one to three thousandths of an inch away from the cavity 12. Those skilled in the art will recognize that the tool obstruction 26 starting in this position will result in a cleaner, more precise final look. The tool obstruction 26 is also at an angle to the edges of the cavity 12. The difference in angles between the tool obstruction 26 and cavity 12 edges should be between one and ten degrees. However, for a more precise manufacturing, it is most desired that the angle difference be between one and five degrees.

Yet another embodiment of the method of the present invention is shown in FIGS. 7 and 8. In this embodiment, as the tool obstruction 26 moves away, a tab 28 of material from the first trim element 8 tears away and the second shot of material 18 fills into the place left behind by the tab 28. The method as seen in FIGS. 5–8 depict the same end result of an interior trim component that is up to 100% grained produced under a non-shut-off condition.

In the embodiments shown in FIGS. 1–8, the first shot of material 14 creates the first trim element 8 to a desired specification. This first trim element 8 will have its own unique class-A side surface texture and color that is desired for a particular look in a motor vehicle. In both low line and high-end vehicles, the first shot of material 14 will comprise of a plastic material such as polypropylene. However, those skilled in the art will appreciate that other suitable materials can be used.

The second shot of material 18 for the embodiments shown in FIGS. 1–8 creates the second trim element 10 that is also according to a desired specification. The second trim element 10 will have its own unique class-A side surface texture and color. In low line vehicles, this second trim element 10 will comprise of a plastic material such as polypropylene. In low line vehicles, both trim elements being a heartier plastic will increase the longevity of the trim components. In high-end vehicles, the second trim element 10 will comprise of a thermoplastic elastomer such as a styrenic based copolymer thermoplastic elastomer or an olefinic based thermoplastic elastomer. This gives the interior trim component a more luxurious look that is desired with high-end vehicles. As in the first trim element 8, those skilled in the art will appreciate that other suitable or comparable materials can be used to produce the second trim element 10 as the need arises.

Using this method will create an interior trim component as one piece instead of separate pieces that are joined to create a desired look or feel is highly desired by the automotive industry. The look that results from this method of manufacturing produces a superior look over the known methods of producing trim systems. The entire trim system is grained as a result of this method, which has not been known to happen using existing art forms.

The above presents a description of the best mode contemplated for carrying out this invention. The claims should not be read as limited to the described order or elements unless stated to that effect. Therefore, all embodiments that come with the scope and spirit of the following claims and equivalents thereto are claimed as the invention.

What is claimed is:

1. A non-shut-off method manufacturing a trim component for the interior of a vehicle comprising the steps of:
   actuating a movable tool obstruction to define a ditch adjacent a mold cavity, the mold cavity adapted to form a molded trim component having a groove therein;
   injecting a first shot of material into the mold cavity so as to substantially stop at the actuated movable tool obstruction, the first shot of material is adapted to form a first trim element having a grained class-A side, the actuated movable tool obstruction adapted to permit flash to enter the ditch to provide a non-shut-off condition relative to injecting the first shot of material;
   injecting a second shot of material into a secondary void to form a second trim element having a grained class-A side, the retracted movable tool obstruction adapted to permit the flash to enter the ditch to provide a non-shut-off condition relative to injecting the second shot of material;
   retracting the movable tool obstruction during said step of injecting the second shot of material to define the secondary void within the mold cavity and to operatively position the ditch therebetween; and
   bonding the second trim element to the first trim element as they form within the mold cavity, wherein at least a portion of the second trim element is bonded to the first trim element within the groove, thereby forming a molded trim component having up to a 100% grained class-A side.

2. The method as set forth in claim 1 wherein said step of bonding the second trim element to the first trim element further includes bonding a portion of the second trim element to a class-B side of the first trim element, so as to abut a portion of the class-A side of the second trim element to a portion of the class-A side of the first trim element within the groove.

3. The method as set forth in claim 1 wherein said steps of injecting the second shot of material further includes at least one of the steps of:
   injecting the second shot of material to form a second trim element having the same color and texture as the first trim element;
   injecting a second shot of material to form a second trim element having a different color than the first trim element; and
   injecting a second shot of material to form a second trim element having a different texture as the first trim element.

4. The method as set forth in claim 1 wherein said step of injecting the first shot of material further includes injecting a polypropylene material to form the first trim element.

5. The method as set forth in claim 1 wherein said step of injecting the second shot of material further includes one of the steps of:
   injecting polypropylene material to form the second trim element; and
   injecting thermoplastic elastomer material to form the second trim element.

6. The method as set forth in claim 1 wherein said step of retracting the tool obstruction further includes retracting the tool obstruction between one and five millimeters as the second shot of material fills the mold cavity.

7. The method as set forth in claim 1 wherein said step of injecting the first shot of material further includes substantially filling the ditch to form a tab within the first trim element that is substantially encased within the second trim element during said step of injecting a second shot of material.

8. The method as set forth in claim 1 wherein said step of bonding the second trim element to the first trim element further includes forming a molded trim component having up to a 100% grained class-A side and a groove thereon, wherein the groove includes a width of between 0.1 and 10 millimeters and a length between 1 and 5 millimeters.

9. A non-shut-off method manufacturing a trim component for the interior of a vehicle comprising the steps of:
actuating a movable tool obstruction within a mold cavity adapted to form a molded trim component having a groove therein, the actuated movable tool obstruction adapted to partition the mold cavity from a secondary void therein substantially at the groove;
injecting a first shot of material into the mold cavity so as to substantially stop at the actuated movable tool obstruction, the first shot of material is adapted to form a first trim element having a grained class-A side;
injecting a second shot of material into a secondary void to form a second trim element having a grained class-A side, the retracted movable tool obstruction adapted to permit a portion of the second shot of material to operatively engage a class-B side of the first trim element as it forms to provide a non-shut-off condition relative to injecting the second shot of material;
retracting the movable tool obstruction during said step of injecting the second shot of material to define the secondary void within the mold cavity; and
bonding the second trim element to the first trim element as they form within the mold cavity, wherein at least a portion the second trim element is bonded to the class-B side of the first trim element, so as to abut a portion of the class-A side of the second trim element to a portion of the class-A side of the first trim element within the groove, thereby forming a molded trim component having up to a 100% grained class-A side.

10. The method as set forth in claim 9 wherein said steps of injecting the second shot of material further includes at least one of the steps of:
injecting the second shot of material to form a second trim element having the same color and texture as the first trim element;
injecting a second shot of material to form a second trim element having a different color than the first trim element; and
injecting a second shot of material to form a second trim element having a different texture as the first trim element.

11. The method as set forth in claim 9 wherein said step of injecting the second shot of material further includes one of the steps of:
injecting polypropylene material to form the second trim element; and
injecting thermoplastic elastomer material to form the second trim element.

12. The method as set forth in claim 9 wherein said step of bonding the second trim element to the first trim element further includes forming a molded trim component having up to a 100% grained class-A side and a groove thereon, wherein the groove includes a width of between 0.1 and 10 millimeters and a length between 1 and 5 millimeters.

* * * * *